United States Patent
Savonuzzi

(10) Patent No.: US 6,447,706 B1
(45) Date of Patent: *Sep. 10, 2002

(54) METHOD OF PRODUCING STRATIFORM ARTICLES AND PRODUCTS

(75) Inventor: Andrea Savonuzzi, Sheboygan, WI (US)

(73) Assignee: Lear Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/704,097

(22) Filed: Nov. 1, 2000

Related U.S. Application Data

(63) Continuation of application No. 08/133,283, filed on Oct. 7, 1993, now Pat. No. 6,165,404, which is a continuation of application No. 07/780,060, filed on Oct. 21, 1991, now abandoned.

(30) Foreign Application Priority Data

Oct. 24, 1990 (EP) .............................. 90810816

(51) Int. Cl.⁷ ................ B29C 45/14; B29C 61/02; B29C 70/78
(52) U.S. Cl. ................. 264/266; 264/259; 264/275
(58) Field of Search ................ 264/250, 254, 264/266, 275, 277, 511, 513, 274, 294, 296, 255, 230

(56) References Cited

U.S. PATENT DOCUMENTS

| | | | |
|---|---|---|---|
| 3,551,540 A | 12/1970 | Pellicciari et al. | |
| 4,307,058 A | 12/1981 | Morello et al. | |
| 4,481,160 A | 11/1984 | Bree | |
| 4,595,544 A | 6/1986 | Maruyama et al. | |
| 4,622,191 A | 11/1986 | Takeuchi | |
| 4,779,390 A | 10/1988 | Repper et al. | |
| 4,781,956 A | 11/1988 | Zimmermann et al. | |
| 4,810,452 A | 3/1989 | Taillefert et al. | |
| 4,830,929 A | 5/1989 | Ikeda et al. | |
| 4,873,045 A | 10/1989 | Fajita et al. | |
| 5,292,476 A | * 3/1994 | Jones ......................... | 264/267 |
| 5,650,115 A | * 7/1997 | Proos et al. ................. | 264/400 |
| 5,679,301 A | * 10/1997 | Miklas et al. ................ | 264/161 |
| 5,728,342 A | * 3/1998 | Wirt et al. ................... | 264/259 |
| 5,811,053 A | * 9/1998 | Ota et al. .................... | 264/511 |

FOREIGN PATENT DOCUMENTS

| | | |
|---|---|---|
| DE | 2 114 181 | 3/1971 |
| EP | 0 045 421 | 2/1982 |
| EP | 0 326 408 A2 | 8/1989 |

OTHER PUBLICATIONS

European Search Report—Aug. 28, 1991.
Patent Abstracts of Japan, Appln. No. 60194065, Publication No.: 6, pp. 1–2 http://www.delphion.com/cgi–bin/view-pat.cmd/JP62053811A2.

* cited by examiner

*Primary Examiner*—Angela Ortiz
(74) *Attorney, Agent, or Firm*—Brooks & Kushman P.C.

(57) ABSTRACT

A method of producing a stratiform article includes disposing a preformed insert on a first mold portion, the insert having an exposed edge portion; injection molding a thermoplastic polymer into a mold cavity formed by the first mold portion and a second mold portion so that the polymer substantially fills the cavity and covers the exposed edge portion of the insert on its front, back and edge; and allowing the polymer to solidify, thereby forming a substrate that is bonded to the insert and has a recess in which the edge portion of the insert is disposed, wherein the insert covers a portion of an outer surface of the substrate.

11 Claims, 1 Drawing Sheet

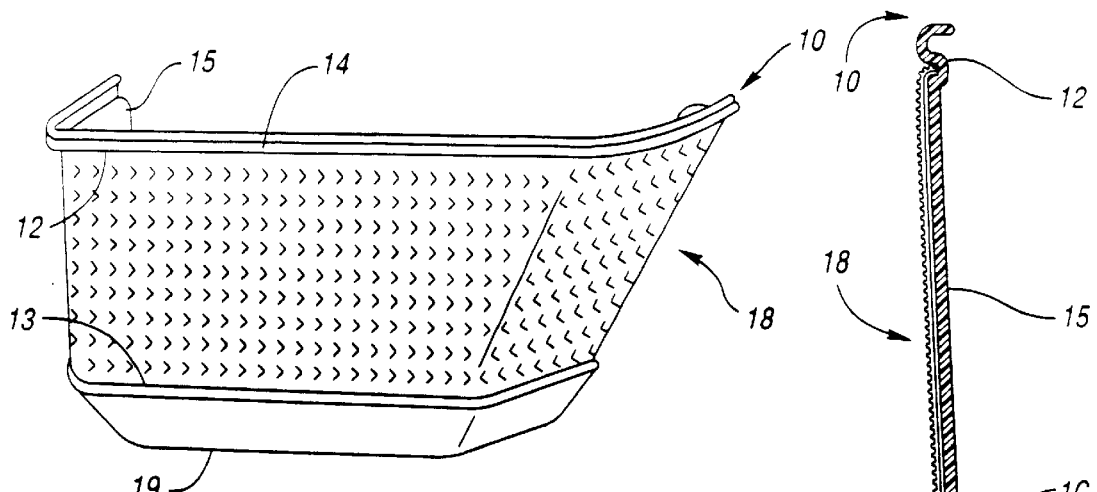
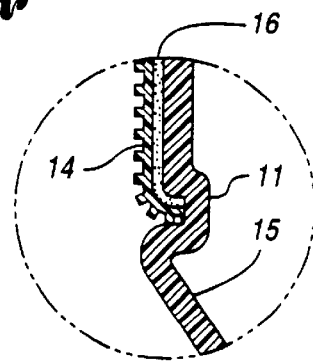
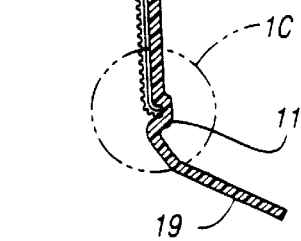
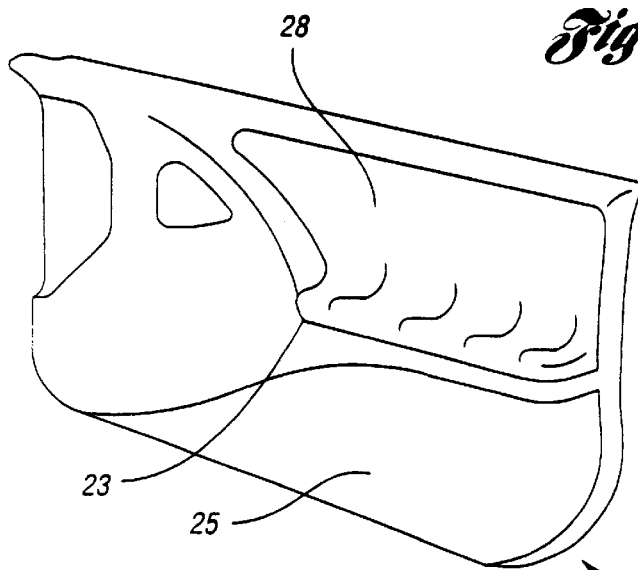
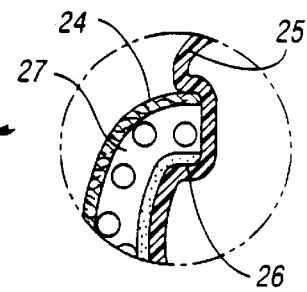
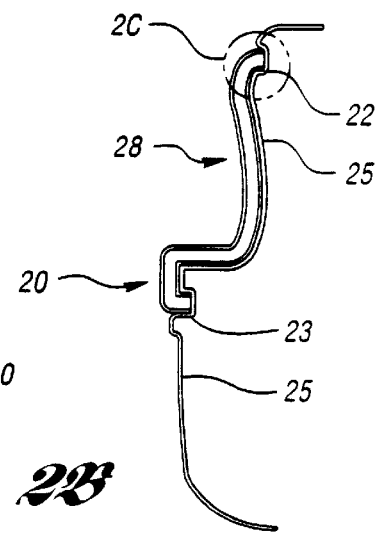

METHOD OF PRODUCING STRATIFORM ARTICLES AND PRODUCTS

CROSS-REFERENCE TO RELATED APPLICATIONS

This application is a continuation of U.S. application Ser. No. 08/133,283 filed Oct. 7, 1993, now U.S. Pat. No. 6,165,404, which is a continuation of U.S. application Ser. No. 07/780,060 filed Oct. 21, 1991, now abondoned, which claims the benefit of European Patent Application No. 90810816.0 filed Oct. 24, 1990.

BACKGROUND OF THE INVENTION (1) Field of the Invention

This invention generally relates to molding of plastics and specifically to a method of producing an essentially self-supporting stratiform article, typically a trim panel of the type used in the interior of automotive vehicles such as vertical wall panels including door panels.

(2) Description of the Prior Art

Generally, trim panels for automobiles are composed of a substrate or base layer for mechanical strength and of an outer cover for visual appearance, feel, and/or comfort. Also, the outer cover frequently comprises more than one area with a specific or distinct color, texture, or resilience; for example, one or more vinyl-covered area(s) for resistance against soil and abrasion are combined with one or more, e.g. two to four areas covered with a textile such as carpeting, cloth or velvet, a foamed layer, man-made or natural leather for pleasing appearance, comfort or soil resistance.

Safe and easy placement of segments of cover stock cut in accordance with the surface area(s) that is (are) to be provided with the particular cover layer,and—most importantly—in close register with one or more selected area(s), presents several problems some of which may need mutually exclusive solutions so as to require some compromise in the balance of properties.

Most of the problems connected therewith tend to be aggravated by the fact that typical trim panels are "profiled", i.e. not essentially planar but shaped "three-dimensionally" to some extent so as to have a "depth" dimension in addition to having width and length. For example, protruding arm rests previously made as separate parts for subsequent mounting on a trim panel should be molded integrally with the panel to simplify production, and such arm rests, typically, require a specific surface structure, be it for comfort of use or for visual appearance. Additional problems are encountered when environmental requirements must be met, e.g. regarding disposal or recycling, or when some desired properties of a material defy meeting another requirement, e.g. the desirable toughness of polypropylene contrasted with its adhesive-repellant surface properties. Further, various aspects of the problems involved, such as structural integrity, ease of manufacture and off-set avoidance tend to increase, sometimes geometrically, with the number of the differing cover segments, e.g. more than two and up to eight or even ten.

The art is replete with teachings of methods for making trim panels and the disclosure in U.S. Pat. Nos. 4,781,956, 4,779,390, 4,810,452, 4,830,929 and 4,873,045 is mentioned by way of example representing what applicant feels to be the most pertinent art herein. Yet, the multiplicity of methods proposed previously might be an indication of the fact that no generally satisfactory method has been found up to now, notably when mass production technology is concerned.

DISCLOSURE OF INVENTION

Under the invention, a method of producing a stratiform article includes disposing a preformed insert on a first mold portion, the insert having an exposed edge portion; injection molding a thermoplastic polymer into a mold cavity formed by the first mold portion and a second mold portion so that the polymer substantially fills the cavity and covers the exposed edge portion of the insert on its front, back and edge; and allowing the polymer to solidify, thereby forming a substrate that is bonded to the insert and has a recess in which the edge portion of the insert is disposed, wherein the insert covers a portion of an outer surface of the substrate.

Advantageously, because the edge portion is disposed in the recess, rather than being exposed, the edge portion will not mar the visual appearance of the article.

The disposing step may include disposing the insert on the first mold portion such that the insert has an additional exposed edge portion. The injection molding step may then include injection molding the thermoplastic polymer into the mold cavity so that the polymer covers the additional edge portion on its front, back and edge.

In an embodiment described below, the insert comprises a shielding layer and a cover layer. Advantageously, the shielding layer may function as a shrinkage buffer and a permeation barrier between the cover layer and the thermoplastic polymer that is injected into the mold cavity.

Further under the invention, a method of producing an essentially self-supporting stratiform article usable as an interior automotive panel includes disposing a preformed, contoured laminate insert on a first mold portion, the insert including a leather cover layer and having a pair of opposing exposed edge portions; injection molding a thermoplastic polymer into a mold cavity formed by the first mold portion and a second mold portion so that the polymer substantially fills the cavity and covers each exposed edge portion on front, back and side surfaces of each edge portion; and allowing the polymer to solidify, thereby forming a substrate that is bonded to the insert and has a pair of recesses in which the edge portions of the insert are disposed, wherein the insert covers only a portion of an outer surface of the substrate.

While exemplary embodiments of stratiform articles and exemplary methods for making the same are illustrated and disclosed, such disclosure should not be construed to limit the claims. It is anticipated that various modifications and alternative designs may be made without departing from the scope of the invention.

DESCRIPTION OF THE DRAWINGS

The invention will now be further illustrated without limitation by means of the enclosed drawings in which:

FIG. 1A is a semi-diagrammatic elevational view of a stratiform article produced according to the invention;

FIG. 1B is a sectional view of FIG. 1A with a portion, indicated by a circle, shown in enlarged scale for clarity;

FIG. 2A is a semi-diagrammatic elevational view of another example of a stratiform article produced according to the invention; and FIG. 2B is a sectional view of FIG. 2, again with a circled portion shown in an enlarged scale for clarity.

BEST MODES FOR CARRYING OUT THE INVENTION

Under the invention, a method is provided for producing an essentially self-supporting stratiform article having a substrate layer formed of a normally solid thermoplastic polymer composition, and at least one surface portion formed by an insert or preformed laminate. The preformed laminate includes a cover layer made of a generally flexible material having an external visual appearance that differs from the substrate layer but is firmly connected therewith.

As used herein, the term "essentially selfsupporting stratiform article" is intended to refer to a physical structure having maximum length and width dimensions that are significantly greater than the gauge or "thickness" even though that structure may have a significant "profile depth" when viewed perpendicularly relative to the main length and width extension, or "main plain", of the article. Generally, this implies a minimum surface area, say of at least about 100 square centimeters; the article will be "essentially self-supporting" if it retains its structural integrity and shape when its main plane is arranged in an essentially horizontal position while the article is supported only at a portion of its periphery. However, some reversible deformation of the article by bending under its own weight does not detract from it being considered to be "self-supporting".

The term "substrate" refers to the article's constituent stratum or layer that normally provides the dominating portion of the mass of the article and, in essence, determines its mechanical strength properties. The term "normally solid thermoplastic polymer composition" is intended to refer to a material that contains, or essentially consists of, an organic polymer that is solid at normal ambient temperatures. The thermoplastic polymer may contain pigments, additives, etc. provided that the resulting composition is thermoplastic, i.e., becomes soft and fluid at elevated temperatures of typically above 100° C., generally above 120° C. and preferably above 150° C. Polyolefins are generally preferred herein and polypropylene is particularly preferred.

The term "generally flexible" as used herein to characterize the cover layer is intended to encompass sheet materials including films, woven, non-woven or knit textile materials, natural or man-made leather, foamed sheet materials and generally any material actually or potentially of use in prior art methods of forming trim panels; these materials are flexible in the sense of being capable of bending without rupture and, frequently, have some stretch capability.

The difference of visual appearance between cover layer portions at the "outer", i.e., visually exposed side of the trim panels as used, e.g., mounted in a vehicle, and the substrate can be of any type including shade, color, texture, feel etc. It should be noted, however, that portions of the article's surface might be formed by the uncovered substrate which may, but need not, have an embossed, matted or otherwise structured surface appearance formed upon molding.

The stratiform article 10 illustrated in FIGS. 1A and 1B is a vertical trim panel for use in automobiles formed of substrate layer 15 produced by injection molding of polypropylene in a conventional moulding cavity (not shown) together with a preformed laminate 18 made, in turn, by laminating a shieldding layer 16 composed of polypropylene in mixture with wood powder and a carpet cover layer 14. Panel 10 is provided with an upper bead 12 and a lower bead 13. Substrate 15 is interfusingly connected with the preformed laminate 18 in the area between upper bead 12 and lower bead 13 while the lower portion 19 of substrate 15 has no cover layer and may have a smooth or "embossed" surface structure depending upon the surface characterstics of the injection mould. It will be understood that the injection mould portion for forming the "outer" face, i.e. the decorated side of panel 10 where the textile cover layer 14 determines its visual appearance, is formed by the "female" portion of the injection mould (not shown) while the "backside" of panel 10 is formed by the "male" portion of the injection mould. It will be noted that the female as well as the male portion of the injection mould may consist of one or more injection mould components. Further, it is to be understood that the upper end of the preformed laminate 18 has an analogous structure as the lower end (shown in FIG. 1C).

Thus, the edge portion of the laminate is curved to abut within a recess 11 adjacent bead 13 so that the visual appearance of the decorated side of panel 10 is not marred by any unsightly edges of the preformed laminate 18 or its shielding layer 16. Further, because the sheilding layer 16 octsasa permeation barrier as well as a shrinkage buffer as discussed below in detail, the textile cover layer 14 will show neither unsightly spots of permeated fluid resin from substrate 15 nor wrinkles caused by mould shrinkage of substrate 15.

FIG. 2A is a semi-diagrammatic elevational view of a door panel 20 formed of substrate 25, e.g. of polypropylene, and a preformed laminate 28 constituting an arm rest. As shown in FIG. 2B and FIG. 2C the preformed laminate 28 consists of a shielding layer 26 of the same type as showm in FIGS. 1A and 1B, and of a relatively thick cushion top layer comprised of an outer "skin" portion 24, e.g. made of vinyl, and a foamed core 27, e.g. made of expanded polyurethane or expanded polyolefin including expanded polyethylene. In this instance, shielding layer 26, in addition to providing interbonding connection with substrate 25, acts both as a permeation barrier as well as a heat shield preventing undue thermal deformation of the cushion layer constituents 24, 27, even though the latter may have a substantially lower softening temperature than the thermoplastic polymer composition used for injection molding of substrate 25.

Again, as in FIGS. 1A and 1B, the preformed laminate 28 consisting of the shielding layer 26 and the cushion layer components 24, 27 will be positioned in the female portion of the injection mould (not shown) used for forming door panel 20. The thermoplastic composition used for injection molding of the substrate 15, 25, respectively, will be introduced into the injection mould via one or more outlet openings in the male portion of the injection mould that defines the less critical inner side of panels 10, 20. By the same token, reinforcing elements, e.g. ribs, as well as mounting brackets can be formed integrally with substrate 15, 25 without the danger of producing "sink-marks" as explained below.

For manufacturing panels 10, 20 the preformed laminate is first produced from the decorative layer materials and the shielding layer materials in a conventional compression press die, e.g. at a pressure of about 30 lbs per square inch and a laminating temperature (at backing board) of about 350° F. Lamination is achieved in the compression cycle and the laminate is trimmed in the die. The preformed laminate or insert so produced is positioned in the matching surface portion of the female injection molding die mounted in a conventional press. The injection mould is closed by connecting the female and the male injection die portions, and the thermoplastic moulding component for the substrate of the panel is injected through the male (or punch) side of the die at the required injection temperature as specified by the producer of the injection molding compound used. Peel strength tests of the resulting bond between the cover layer and the substrate indicate integral bonding by intermelting the surface.

Injection molding is a well-established art, of course, and prior art apparatus and operating conditions can be used for practicing the invention. Since this is within normal competence of those skilled in the molding art, injection molding requirements for use in practicing the invention will not be explained in further detail.

Generally, the shielding layer as used according to the invention is a constituent of a preformed laminate which, in turn, can be produced by conventional methods, e.g., in a laminating press and with operating conditions know per se in the lamination art. Typically, the preformed laminate used according to the invention will be "self-supporting" in the sense defined above for the finished article because this greatly improves positioning and holding of the preformed laminate in the female mold portion during injection molding of the substrate.

It is assumed that the advantageous action of the shielding layer is due to several contributive effects which, in turn, can be controlled by a suitable choice of the parameters involved. Generally, the shielding layer is both thermoplastic and compatible with the composition of the substrate layer. The term "compatible" as used herein means the capacity of one thermoplastic substance or composition to interbond, i.e., to adhesively interfuse or intermelt with another thermoplastic substance or composition when heated in mutual contact to softening temperatures so as to form a bonding interface generally caused by some interflow and/or hot-blending of the constituents involved in the area of the common interface.

An essential and main effect of the shielding layer is to securely and adhesively hold the cover layer in the mold cavity while at the same time protecting it from the impact of the fluid (i.e., being heat-plasticized to the extent permitting injection molding) thermoplastic composition that is injected into the mold cavity for forming the substrate layer. So, while the shielding layer is compatible with the injected thermoplastic composition to permit interfusion with the latter, it should not "melt-down" when in contact with the hot injected mass, i.e., prevent or, at least, substantially retard formation of an essentially fluid stratum immediately adjacent the cover layer when the thermoplastic polymer composition for forming the substrate layer is injected into the mold cavity. The shielding layer, in other words, should act as a permeation barrier between the cover layer material and the hot composition injected into the mold cavity for forming the substrate layer.

This can be achieved in a number of ways all of which tend to increase overall fluidity or viscosity of the material of the shielding layer with respect to the fluidity or viscosity of the material of the substrate layer when exposed to injection molding temperatures; for example, the shielding layer could be formed of a thermoplastic polymer which, while compatible and capable of interfusing with the thermoplastic polymer of the substrate layer, has a higher melt viscosity than the latter. A further method is to reduce thermal conductivity, i.e., to increase thermal insulating properties of the shielding layer, e.g., by incorporation of a component that has a low thermal conductivity. Yet, another method is by means of filler-induced structural viscosity effects known per se in the art of plastics processing.

A generally preferred method believed to combine some of the above mentioned effects is to use a shielding layer composed of a substrate-compatible thermoplastic polymer in intimate mixture with a particulate filler that remains solid at the injection temperature of the substrate composition. Typically, a particulate filler of the "granular" type, i.e., having no particular "length" dimension, should have a maximum particle size of less than about half the thickness of the shielding layer, preferably below 500 micrometers, e.g., about 50 to 300 micrometers. Conventional fillers of both inorganic as well as organic provenience can be used. Cellulosic fillers, e.g., wood powder, are a preferred filler species for use in the shielding layer according to the invention. Commercially available sheet materials, e.g., those sold under the trade name "wood-stock" by ASAA Inc., Sheboygan, Wis., U.S.A., with or without an adhesive coating for improved bonding with standard cover materials are a preferred material for the shielding layer according to the invention. As will be apparent to those skilled in the art, preformed laminates of typical cover layer materials and shielding layer materials can be formed by conventional lamination methods, e.g., in a press in which a layer of the cover material is compressed in a mold together with a layer of the shielding material in a thermally plastified state.

Preferably, the shielding layer used in the method of the invention provides for at least one further shielding effect, namely that of a shrinkage buffer, i.e., so as to reduce the impact of shrinkage of the substrate while solidifying in the injection mold upon the cover layer. While shrinkage can be defined and measured in terms of rates or other relations, a simple criterion is used herein to define optimum results: since a stratiform body has two elongated or "longitudinal" extensions (i.e., in the "length" as well as the "width" dimension), a simple method of determining pertinent shrinkage properties is to measure a longitudinal end-to-end dimension of the mold cavity, prepare a molded shape of a polymer composition by injection molding, and measure the difference between an end-to-end mold cavity dimension and the corresponding dimension of the molded article.

With many typical thermoplastic compositions used commercially for injection molding purposes, such shrinkage will be in the range of from about 2 to 7% (linear extensions), i.e., the measured dimension of the molded product will have a length that is 2 to 7% smaller than the length of the corresponding cavity dimension.

So, while the shielding layer is capable of interbonding with the substrate composition upon injection molding, the shielding layer preferably has a significantly reduced mold shrinkage typically amounting to 25 to 75% of the shrinkage of the substrate composition, e.g., having a shrinkage of only about 0.5 to 1.5% if the substrate has a shrinkage of 2%. Preferably, the shrinkage of the shielding layer should be about half that of the substrate layer or even less. The aim of shrinkage buffering is, of course, to prevent distortions, wrinkling and other forms of deformation of the cover layer material since the latter, in many of its typical and preferred forms, will have substantially no mold shrinkage, such as a textile layer made of cotton, wool or of synthetic fibers of use herein, i.e., showing no significant deformation when used in the injection molding step of the inventive method.

The requirement of mutual compatibility tends to limit the possibility of varying the polymer constituents of substrate and shielding layer for shrinkage buffering. However, a generally preferred method of reducing the shrinkage of the shielding layer is to incorporate a shrinkage-reducing component in the composition used for making the shielding layer of the preformed laminate, typically a filler that remains solid when heated to injection molding temperatures. In other words, if the shielding layer is made, for example, of a mixture of about equal parts of a thermoplastic polymer having a shrinkage (as defined above) of 2%, and of a non-thermoplastic filler having substantially no shrinkage, the resulting shielding layer will have shrinkage significantly below 2%, e.g., about 1%. While various fillers having such an effect will be apparent to those skilled in the art, particulate wood is a typical example for use to achieve shrinkage buffering in a shielding layer made of a polyolefin, such as polypropylene.

When using preferred polymer-filler blends for forming the shielding layer, the thermoplastic polymer constituent may provide from about 20 to about 80%, preferably about 40 to about 60%, by weight, of the shielding layer (i.e., based upon the weight thereof), while the filler constituent forms a complementary portion, i.e., from about 80 to about 20%, preferably from 60 to 40%, by weight, again based upon the weight of the shielding layer. The shielding layer may contain further components provided that the above discussed properties of compatibility and capacity to interfuse with the material of the substrate and of at least one shielding effect are not affected. For example, the shielding layer may contain conventional additives and adjuvants, including pigments and stabilizers, or may contain recycled or regenerated materials of the same stock materials.

Preferred thermoplastic polymers for use both in the substrate as well as in the shielding layer are selected from polyolefins; polypropylene is particularly preferred. Homopolymers as well as copolymers including graft copolymers prepared by conventional polymerization from suitable monomeric olefins are suitable herein; copolymers of the ABS type (i.e., those typically made of acrylonitrile, butadiene and styrene or substituted equivalents) represent another example. Again, additives and adjuvants conventionally incorporated in thermoplastic polymer compositions for injection molding can be used in forming the substrate layer according to the invention.

Typically, the substrate layer of a stratiform article made according to the invention, e.g., for use as a vertical trim panel, will have a thickness or gauge in the range of from 1 to 10 mm, while the shielding layer has a thickness in the range of from 0.5 to 3 mm. The cover layer, on the other hand, can have any thickness or gauge in which typical materials for use as cover layers are applied in trim panels or other stratiform articles, e.g., carpets, man-made leather, foamed sheet materials etc., in the range of from about 200 micrometers to about 10 mm.

The inventive method helps to solve the problem of so-called sink-marks resulting from mould shrinkage where the thickness of the substrate layer is substantially increased so that shrinkage phenomena that act perpendicularly relative to the surface of the substrate, e.g. in the area of reinforcing ribs our mounting stubs, cause a visual cavity in the outer surface of the substrate layer. When practising the invention such marks are no problem because the site of the local thickness increase can easily be positioned below a preformed laminate area where the shielding layer provides a barrier against formation of sink-marks.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of producing a stratiform article, the method comprising:
    disposing a preformed insert on a first mold portion, the insert having an exposed edge portion;
    injection molding a thermoplastic polymer into a mold cavity formed by the first mold portion and a second mold portion so that the polymer substantially fills the cavity and covers the exposed edge portion of the insert on its front, back and edge; and
    allowing the polymer to solidify, thereby forming a substrate that is bonded to the insert and has a recess in which the edge portion of the insert is disposed, wherein the insert covers a portion of an outer surface of the substrate.

2. The method of claim 1 wherein the insert includes a leather cover layer.

3. The method of claim 1 wherein the insert includes a textile material cover layer.

4. The method of claim 1 wherein the insert includes a shielding layer and a cover layer.

5. The method of claim 4 wherein the shielding layer includes a particulate filler.

6. The method of claim 4 wherein the shielding layer includes a thermoplastic layer.

7. The method of claim 6 wherein the thermoplastic layer exhibits shrinkage as a result of the injection molding step, and the shrinkage of the thermoplastic layer is less than about half of shrinkage exhibited by the substrate.

8. The method of claim 6 wherein the thermoplastic layer exhibits shrinkage as a result of the injection molding step, and the shrinkage of the thermoplastic layer is between about 25% to 75% of shrinkage exhibited by the substrate.

9. The method of claim 1 wherein the insert includes a foam core.

10. The method of claim 1 wherein the disposing step includes disposing the insert on the first mold portion such that the insert has an additional exposed edge portion, and wherein the injection molding step includes injection molding the thermoplastic polymer into the mold cavity so that the polymer covers the additional edge portion on its front, back and edge.

11. A method of producing an essentially self-supporting stratiform article usable as an interior automotive panel, the method comprising:
    disposing a preformed, contoured laminate insert on a first mold portion, the insert including a leather cover layer and having a pair of opposing exposed edge portions;
    injection molding a thermoplastic polymer into a mold cavity formed by the first mold portion and a second mold portion so that the polymer substantially fills the cavity and covers each exposed edge portion on front, back and side surfaces of each edge portion; and
    allowing the polymer to solidify, thereby forming a substrate that is bonded to the insert and has a pair of recesses in which the edge portions of the insert are disposed, wherein the insert covers only a portion of an outer surface of the substrate.

* * * * *

UNITED STATES PATENT AND TRADEMARK OFFICE
CERTIFICATE OF CORRECTION

PATENT NO.  : 6,447,706 B1  Page 1 of 1
DATED       : September 10, 2002
INVENTOR(S) : Andrea Savonuzzi It is certified that error appears in the above-identified patent and that said Letters Patent is hereby corrected as shown below:

Column 4,
Line 15, delete "octsasa" and insert -- acts as a -- therefor.

Signed and Sealed this

Twenty-fifth Day of February, 2003

JAMES E. ROGAN
*Director of the United States Patent and Trademark Office*